Dec. 29, 1970     C. PETERS     3,550,208
PLASTICATOR SCREWS HAVING NON-RETURN VALVE MEANS
Filed Dec. 27, 1967
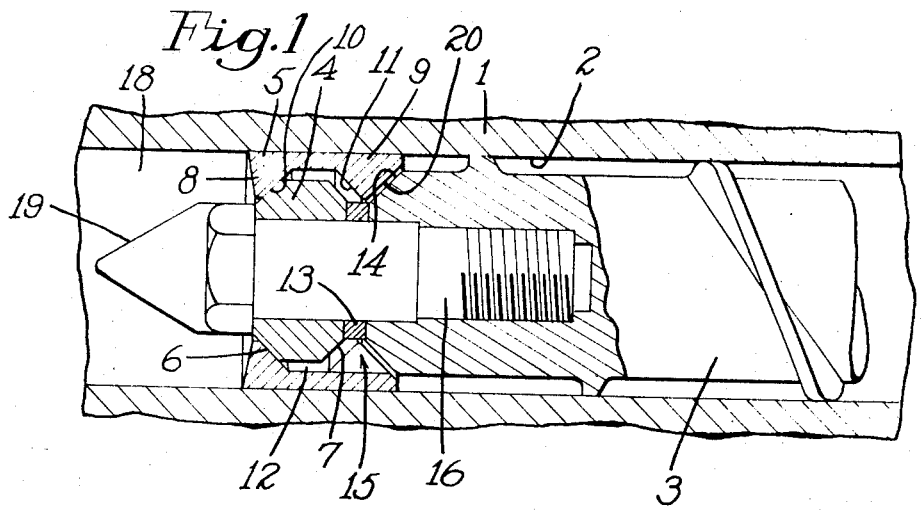
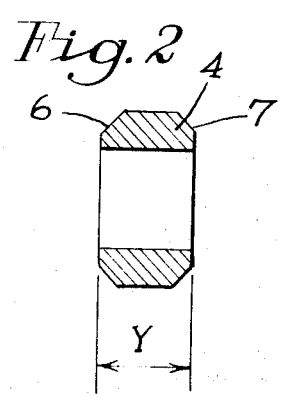
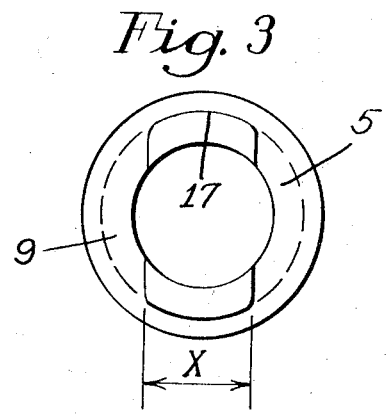
Inventor
Colin Peters
By his Attorney

United States Patent Office 3,550,208
Patented Dec. 29, 1970

3,550,208
PLASTICATOR SCREWS HAVING NON-RETURN VALVE MEANS
Colin Peters, Bramley, England, assignor to USM Corporation, Flemington, N.J., a corporation of New Jersey
Filed Dec. 27, 1967, Ser. No. 693,855
Claims priority, application Great Britain, Jan. 4, 1967, 424/67
Int. Cl. B29f 1/04
U.S. Cl. 18—30    5 Claims

ABSTRACT OF THE DISCLOSURE

An injection molding machine plasticator having a non-return valve comprising a valve core member attached to the leading end of the plasticator screw, a valve ring member slidably located in the barrel of the plasticator and axially displaceable relatively to the valve core member, the ring member having at its leading end an inwardly directed annular flange with a rear face engageable with the valve core member, the ring member having at its other end a second inwardly projecting abutment for engagement with a corresponding part of the valve core member.

BACKGROUND OF THE INVENTION

Field of the invention

This invention relates to injection molding machines and is directed more particularly to injection molding machines of the kind having a feed screw which is rotatable in a cylindrical barrel to forward plastic material to an injection chamber in advance of the screw, and is axially movable at intervals to act as a plunger and deliver a "shot" of plastic material from this chamber into a mold cavity.

Description of the prior art

To insure a uniformly pressurized and uninterrupted delivery at each injection stroke of the plunger screw, steps need to be taken to insure that there is substantially no escape of plastic material backward from the injection chamber along the screw during this stroke. Consequently, screws of this character have been fitted with various forms of non-return valves for this purpose.

SUMMARY OF THE INVENTION

It is an object of this invention to provide a novel form of valve of this nature having a number of advantageous features.

With the above and other objects in view, as will hereinafter appear, the present invention contemplates as a feature thereof the provision of a separable valve core member attached to the leading end of the screw, and the arrangement around the core member of a cylindrical sleeve, or valve ring, which is in a close sliding fit in the barrel, the valve ring being axially displaceable relatively to the valve core member and having at its leading end an inwardly directed annular flange with a rear face for engagement with a corresponding surface on the core member, the valve ring having at its rearward end an inwardly projecting abutment having a face for engaging with a corresponding surface of the core member, there being an annular clearance between the inside wall of the ring member and the periphery of the core member.

The above and other features of the invention, including various novel details of construction and combinations of parts, will now be more particularly described with reference to the accompanying drawings and pointed out in the claims. It will be understood that the particular device embodying the invention is shown by way of illustration only and not as a limitation of the invention. The principles and features of this invention may be employed in various and numerous embodiments without departing from the scope of the invention.

BRIEF DESCRIPTION OF THE DRAWINGS

FIG. 1 is an elevational view, partly in section, showing one form of non-return valve illustrative of an embodiment of the invention;

FIG. 2 is an axial section through the valve core member of the assembly illustrated in FIG. 1; and FIG. 3 is an end view of the valve ring.

DESCRIPTION OF THE PREFERRED EMBODIMENT

Referring to FIG. 1, there is shown an injection molding machine barrel 1 defining a bore 2 which receives a feed and plasticating screw 3.

In accordance with the present invention, a valve core member 4 is attached to the leading end of the screw 3, and a valve ring member 5 is slidably located in the bore 2 and is disposed proximate to the core member 4. The core member 4 may be provided with an inclined leading surface 6 and an inclined trailing surface 7.

The valve ring 5 is a sleeve with a cylindrical peripheral surface which is a sliding fit in the barrel bore 2. The ring 5 at its forward end, or leftward end as viewed in FIG. 1, is provided with an inwardly extending annular flange 8. The ring 5 is provided at its trailing end with a second inwardly extending flange 9. The flange 8 is provided with a rear face 10 which is complementary to the surface 6 of the core member 4, and the flange 9 is provided with a front face 11 complementary to the surface 7 of the core member.

The core member 4 has an outside diameter which is less than inside diameter of the portion of the ring 5 which is of smallest cross-sectional width. Accordingly, when the ring 5 is disposed around the core member 4 there is a clearance 12 between them.

Referring still to FIG. 1, it will be seen that the flange 9 is arranged in an annular recess 15 which is provided around the head of the screw 3 by a spacer ring 13 in abutting engagement with the leading end 14 of the screw 3. The ring 13 may be a separate element or may be an integral part of the screw 3. The core member 4 and the spacer ring 13 are secured to the leading end of the screw 3 by a bolt 16 provided with a tapered head 19 clamping against the core member 4.

Referring to FIG. 3, it will be seen that the flange 9 is provided with diametrically opposite recesses 17 of a width X which is very slightly more than the axial length Y of the core member 4 (see FIG. 2). Thus, in assembly of the valve the core member 4 may be pushed into the ring 5 by way of the recesses 17 and turned through a right angle so that the ring 5 and core member 4 are coaxially disposed, one around the other. The bolt 16 may then be inserted in the valve core 4 and screwed into the end of the screw 3 whereby to assemble the parts in the manner illustrated in FIG. 1.

In operation, when the screw 3 is rotating, but axially stationary, and feeding plastic material through the barrel 2, the plastic will be forced against a rear face 20 of the flange 9 of the ring 5 and will shift the ring 5 forwardly, relatively to the core member 4, until the leading face 11 of the flange 9 engages the surface 7 of the core member 4. At the same time, the surface 6 of the core member and the face 10 of the ring member will part to provide an opening for the flow of the plastic material into an injection chamber 18 forward of the screw 3. The engagement of the surface 7 with the face 11 limits the relative travel of the ring 5, and hence the area of opening of the valve. The flow of plastic material continues through the recesses 17 in the ring, and the opening between the core member 4 and the flange 8.

When the screw 3 makes an injection stroke, which is toward the left as viewed in FIG. 1, the leading face of the ring 5 is applied against the plastic material in the injection chamber 18, causing the ring to move rearwardly relative to the core member 4, to the position illustrated in FIG. 1. The leading face of the ring 5, the head 19, and the area of the core member 4 exposed between the head 19 and the core member 4, will together provide a closed piston surface which causes the material accumulated in the chamber 18 to be ejected into a mold cavity brought into communication with the chamber 18 by any suitable means.

The initial engagement of the surface 6 with the face 10 will have the effect of forcing a certain amount of plastic material rearwardly, but this rearwardly directed plastic will be received in the clearance 12 and, as the injection stroke proceeds, will escape through the recesses 17 whereby to prevent buildup of pressure in the clearance 12 which might otherwise tend to bind the ring against the wall of the bore 2.

Thus, it will be seen that the leading end of the screw has been provided with a fixed core member 4 surrounded by a relatively reciprocable valve ring 5. When the screw is axially immobile but rotating, plastic material forwarded by the screw pushes the ring forward to its forward limit position, whereby to open the valve. Passages 17 facilitate the flow of plastic material into the clearance between the core member and the ring, and thus, through the open valve and into the injection chamber 18. When the screw is moved axially to perform an injection stroke the valve is immediately closed by the body of plastic material then present in the injection chamber, and the leading faces of the core member, the screw, and the ring together provide a closed piston surface covering the full cross-sectional area of the barrel.

Since certain obvious changes may be made in the illustrated device without departing from the scope of the invention, it is intended that all matters contained herein be interpreted in an illustrative and not a limiting sense. For example, the object of the core member 4 is to provide the screw with a head having an outside diameter which gives an annular clearance between the valve core and a valve ring to allow for the flow of material therebetween. Such may be provided by a cylindrical bushing member which is clamped against the leading end of the feed screw, as described above, or by an integral portion of the screw serving the same purpose.

Having thus described my invention, what I claim as new and desire to secure by Letters Patent of the United States is:

1. In an injection molding machine of the type having a rotatable and reciprocable plasticator screw disposed in a plasticator barrel, the improvement comprising valve means disposed proximate to the free end of said screw for preventing substantial back flow of injection molding material in said barrel during an injection stroke of said screw, said valve means comprising in combination valve core means located on said screw proximate to said free end of said screw and valve ring means slidably disposed in said barrel in radial disposition to said valve core means, the said valve core means having an exterior surface comprising a raised central surface portion defined by outwardly inclined leading and trailing surface portions, the said valve ring means having an interior surface comprising a depressed central surface portion defined between inwardly inclined surfaces carried on front and rear flange portions of said valve ring means, the inwardly inclined surface portions of said flange portions being complementary and engageable with the outwardly inclined leading and trailing surfaces of said valve ring means, and the rear flange portion of said valve ring means having recess means extending axially therethrough and communicating with a passage defined between the raised central exterior surface portion of said valve core means and the depressed central interior surface potion of said valve ring means.

2. The invention according to claim 1 wherein recess means provided in the rear flange portion of said valve ring means comprises a plurality of recesses.

3. The invention according to claim 1 wherein the recess means provided in the rear flange portion of said valve ring means comprises at least two diametrically opposed recesses with the width of each recess greater than the axial length of the valve core means.

4. The invention according to claim 1 wherein the rear flange portion is recessed in a peripheral recess disposed between a plasticating portion of said screw and said valve core means.

5. The invention according to claim 1 wherein the valve core means is separably attached to the leading end of the screw by bolting means disposed in axial alignment with said screw and having a forwardly tapering head.

References Cited
UNITED STATES PATENTS

| | | | |
|---|---|---|---|
| 3,007,202 | 11/1961 | Wucher | 18—30 |
| 3,131,433 | 5/1964 | Volland | 18—30 |
| 3,452,398 | 7/1969 | Siegel | 18—30 |

WILBUR L. McBAY, Primary Examiner